June 9, 1953 H. S. PACKARD 2,641,406
TABULAR CALCULATOR
Filed Dec. 24, 1949 2 Sheets-Sheet 1

Inventor
HENRY S. PACKARD
By Oberlin & Limbach
Attorneys

EXTRACT FROM TABLE B COMPLETE ACROSS THE WIDTH

| COL. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|
| | 362 | 363 | 364 | 365 | 366 | 367 | 368 | 369 | 370 | 371 | 372 | 373 | 374 | 375 | 376 | 377 | 378 | 379 | 380 | 381 | 382 | 383 | 384 | 385 | 386 | 387 | 388 | 389 | 390 |
| | 347 | 348 | 349 | 350 | 351 | 352 | 353 | 354 | 355 | 356 | 357 | 358 | 359 | 360 | 361 | 362 | 363 | 364 | 365 | 366 | 367 | 368 | 369 | 370 | 371 | 372 | 373 | 374 | 375 |
| | 332 | 333 | 334 | 335 | 336 | 337 | 338 | 339 | 340 | 341 | 342 | 343 | 344 | 345 | 346 | 347 | 348 | 349 | 350 | 351 | 352 | 353 | 354 | 355 | 356 | 357 | 358 | 359 | 360 |
| | 317 | 318 | 319 | 320 | 321 | 322 | 323 | 324 | 325 | 326 | 327 | 328 | 329 | 330 | 331 | 332 | 333 | 334 | 335 | 336 | 337 | 338 | 339 | 340 | 341 | 342 | 343 | 344 | 345 |

G

G'

Fig. 5

INVENTOR
Henry S. Packard
BY Oberlin & Limbach
ATTORNEYS

UNITED STATES PATENT OFFICE 2,641,406

TABULAR CALCULATOR

Henry S. Packard, Cleveland Heights, Ohio, assignor to The Standard Oil Company, Cleveland, Ohio, a corporation of Ohio Application December 24, 1949, Serial No. 135,000

7 Claims. (Cl. 235—61)

This invention relates to simplified mechanical calculation in which a device with sets of data figures and answer figures are arranged with mechanical coordinating and positioning elements to give a reading as determined by the position of the coordinating element oriented from a data figure and reading directly to the desired result in the answer set of figures. The device can be used for performing rapid calculations to assist distribution of commodities among a plurality of receiving points. Also, it may be used for rapid determination of times for supplying materials to respective points. A particularly advantageous application is the rapid determination of times for replenishing tanks which are being drawn on at respectively known rates. And by its use, for instance the details of maintaining a schedule for the supplying of customers with furnace oil or desired petroleum products may be mechanically systemized. Other objects and advantages will appear from the following description.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 5 is an extract from the large set of numerical values B complete across its width.

Figure 1:
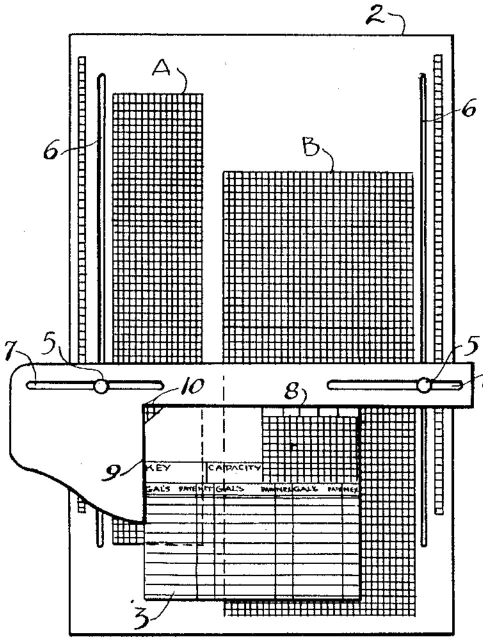
Fig. 1 is a plan view of calculating apparatus in accordance with the invention.
Figure 2:
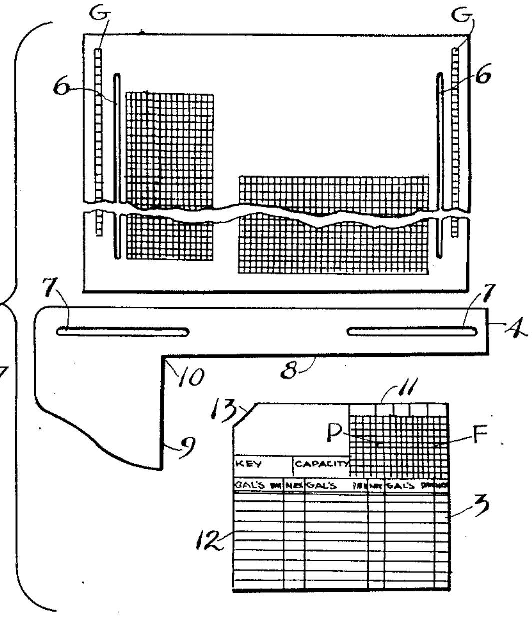
Fig. 2 is a plan view, partly broken on account of space limitation, showing the parts of the device dis-assembled.
Figure 3:
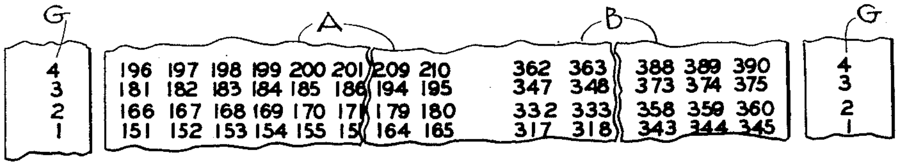
Fig. 3 is an enlarged fragmentary view across the sets of numerical values, showing their characteristic kind of arrangement.

In general, the device involves a panel 2 upon which are positioned two sets of figures or numerical values, A, B, the former being data numbers, and the latter being answer-numbers. Both sets are arranged in columns and horizontal rows, and in the particular embodiment illustrated, the numbers in table A are in consecutive order reading from left to right horizontally, and progressing upward, row by row; and the numbers in table B progress in consecutive order from left to right but not in consecutive order from row to row, as each row repeats a part of the series of the next preceding lower row. In the particular embodiment shown, the relationship involves a general positioning of the first set A starting at a point higher, and correspondingly terminating higher, than the second set B. These numbers are permanently carried by such a panel 2, as indicated, and while such panel may be of heavy cardboard, for more durable usage and service it advantageously may be of metal, plastic, etc.

Co-acting with the panel which carries the data and answer figures, are a coordinating element 3, and a slide 4. The latter is preferably mounted on the panel, as by fasteners 5 which are headed front and back to hold the slide from bodily displacement from the panel, and as such may ride in slots 6 near the margins of the panel, and transverse slots 7 in and coaxial with the slide. With this arrangement, it is seen that the slide 4 can be moved up and down and crossways on the panel, to desired positionings. The slide 4 has a straight horizontal edge 8 and a straight vertical edge 9 which form a 90 degree recess corner 10. This recess corner is of importance in relation to figures in the data set A, as it involves a starting point in performing any calculation, as will be seen more in detail below.

Figure 4:
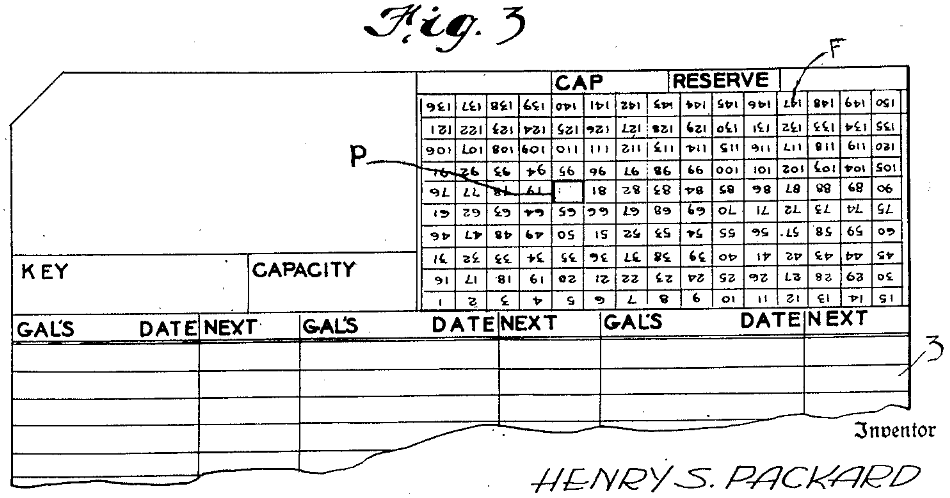
Fig. 4 is an enlarged plan view showing the relation of sight means in the coordinating elements.

The slide preferably is made of some durable material, as metal, wood or plastic. The coordinating element 3, in sheet or plate-like form has a horizontal straight edge 11 and a vertical straight edge 12, and a cut-out 13 at the corner. This element carries also a set of figures F. The arrangement of these figures will in any given case be related to tables A and B. In the particular embodiment of the invention as more clearly shown in Fig. 4, they are in vertical columns and horizontal rows, each row reading from left to right and the number series starting at the lower left corner. A peculiarity in this form is that these figures are inverted. The coordinating element 3 may be of any sufficiently durable material to serve its purpose, cardboard, plastic, etc. And this element is provided with a perforation P which cuts out a figure corresponding to a figure to be referred to more in detail hereafter. With this, it is seen that there is a relationship between the cut-out corner 13 and the positioning of the perforation P, and when the coordinating element is set in place with the slide 4, there is a sight, Fig. 1, or opening through which a figure is visible in the set A, and the perforation P provides a sight opening through which a figure is found and may be read from the set B.

In order to safeguard for precision in positioning of the slide 4 relative to the panel 2, gauging numbers running from one consecutively are located in duplicating sets G on the margins of the panel outside of the slots 6. Thus, in any position of the slide 4 the same numbers on the gauging sets will show through the slots 7 of the slide, or at the upper edge of the slide, or both. In any case, the accuracy of position of the slide 4 is always insured by this visible check as to its squareness with the rows of numbers in the sets A, B.

Calculation by the device is performed by starting with a given data number in the set A, and with the slide 4 positioned to bring its recess angle 10 at the given data number, and the coordinating element 3 positioned with its straight edges against the slide and the cut-out corner 13 in the recess angle 10 of the slide, the answer is shown at the perforation P. In the case of calculating time for example for replenishing customer's fuel oil tanks, consumption of fuel oil is related to requirements as dictated by weather temperature, and a convenient base may be taken as a mean atmospheric temperature of 70° F. That is, fuel oil consumption may be assumed to begin when the atmospheric temperature is 70° F. For each day there is of course a high temperature and a low temperature, as commonly reported by the weather bureau, or readable on "maximum" and "minimum" thermometers. The mean temperature of such day may be the sum of the maximum and minimum divided by two. In one illustrative way of usage then, the difference between such mean temperature for any given day and 70° F. gives a figure which is for the present purposes proportional to the amount of oil consumed from the tank during that day. These figures cumulate day by day, starting for example June 1 of each year, and the cumulative total at any particular day is designated as the degree-day. On days when the mean temperature exceeds 70° there is no change in the degree-day.

Each gallon of fuel oil in a tank and combustion installation will provide a certain amount of service, this varying from tank to tank, and a figure which represents the number of degree-days per gallon of oil, in a given instance, may be called the key factor or "K" factor. This K factor is based on the consumption rate in previous years or the engineering data of the particular furnace. If for instance a customer consumed 100 gallons of oil in 400 degree-days, the K factor would be 400/100 or 4 (per gallon). This key factor may for convenience be entered on the coordinating element. And the K factor in any given case is the degree-days divided by the gallons of oil consumed. For instance, if the mean temperature on the first day of a given month was 49°, that involved a difference of 21 degrees with respect to the standard 70° F., or 21 degrees for that particular day, and similarly if on the succeeding day the mean temperature was 50, this was 20 less than the base temperature 70°, and such 20 degrees cumulate to the aforesaid 21, and then if on the third day the mean temperature is 51°, the difference from 70° is 19, and this further cumulates, making a total of "60 degree days," and so on to make a continuously mounting total. Then, for the purpose of fuel oil, instead of measuring time in weeks or months, it is measured in degree days. And, if the gallon capacity of the tank, less reserve, is taken as a starting point, the K factor multiplied by this available capacity is the duration that a filling of the tank less reserve will last, rated in degree-days.

For a given tank thus, the coordinating element 3 of the calculator is punched for the tanks degree day capacity. For the illustration shown in Fig. 4 this is "80" (meaning 800, the last cipher being omitted to save space). And, in this usage the set of figures A cover a range of values set up in rows and columns reading from left to right, and upwardly, in the set illustrated each row progressing by 15, that is there are 15 columns; and in the set B, the figures range consecutively, reading from left to right and there are 29 columns, but as each horizontal row duplicates in part the series of the preceding row, the increase from row to row is 15 units, the same as in set A. And the numbers in the first 15 columns or in any 15 adjacent columns form a consecutive series, progressing upwardly. Thus, any group of 15 adjacent columns, as for example group G, or group G′, Fig. 5, reads consecutively. A different series may in some cases be used in A if B is suitably proportioned. With this then, taking the showing indicated where the coordinating element is punched for 80, i. e. 800° days capacity, the particular tank having a capacity of 275 gallons, disregarding the maintained reserve of 75 gallons, and as the particular K factor taken here is 4, 800 is the degree day capacity of the tank for that particular installation. As the rate of drawout depends upon the variations of daily mean temperature from the standard 70°, the cumulating degree days over a period of time will come up to the available degree day capacity of the tank. This total, or limit which must determine the next re-filling is easily ascertained on the calculator by setting the slide such that the figure for degree day of delivery shows in the 90° angle, and the coordinating element is placed with its cut-out corner against the slide so that the figure shows through. Then the limit day for re-filling, in terms of degree days, is shown at the perforation P. To illustrate, assume that a customer's tank is filled on such a day that the degree-day is 1750. Set the slide 4 so that the figure 1750/10 or 175 in table A shows in the recess-corner 10. If the tank has a degree-day capacity of 800, the figure 800/10 or 80 would be punched out on the coordinating element 3 as shown. Placing this element then as described above, we read 255 at the perforation P. Thus it shows that when the degree-day is 2550, the tank should be refilled. If the coordinating element has a surface of a nature which can be written upon, it is a particular convenience to set down thereon this degree-day limit figure. Similarly, in any instance the cut-out corner 10 is set at the figure in A for the particular degree-day on which the tank is filled, and the operation of the device will show the degree-days that may be expected to elapse before the tank should be refilled. While the K factor in the illustration above was taken as a whole number, in practice it ordinarily is not such a simple integer, and pencil and paper calculations with the fractions involved would be time-consuming and often introducing errors. The present device gives an accurate short cut. In similar manner, various sets of tanks as in chemical plants, or various points requiring a commodity replenishment, may be quickly calculated, so that in each instance it may be determined when the time limit for the particular point of usage will necessitate a replenishment.

Other modes of applying the principle of the invention may be employed, change being made as regards the details described, provided the features stated in any of the following claims or the equivalent of such be employed.

I therefore particularly point out and distinctly claim as my invention:

1. In a calculating device, a panel having a set of number values in consecutive order in horizontal and vertical columns, and a second set of number values in horizontal and vertical columns laterally of said first set with the numbering consecutive in any group of adjacent vertical columns of the same space expanse as the space expanse of the entire first-named set, a coordinating element having a horizontal straight edge and a vertical straight edge and a tabular arrangement of numbers in consecutive order and in horizontal and vertical columns corresponding in spacing to the spacing of the vertical columns in the said first set of number values, said coordinating element having two sight-openings with horizontal distance therebetween generally equal to the distance between the first vertical columns of said first set and said second set, the coordinating element sight-openings thereby sighting a number value in the first set and an answer in the second set, and a slide and means supporting it for movement over said panel, the slide having a right angle recess corner to position the coordinating element with one sight-opening in said first-named set of number values and its other sight-opening in said second set of number values.

2. In a calculating device according to claim 1, slots in said slide coaxial therewith, slots near the margins of said panel normal to the slots in said slide, and retaining members movable along the slots and holding the slide movably in relation to the panel.

3. In a calculating device according to claim 2, a column of duplication gauge figures to the outside of each of the panel slots for sight relative to the slide for precision registering.

4. A calculating device according to claim 1, in which said first set of number values reads consecutively from the lower left corner, left to right, with increase by fifteen units per each horizontal row, and said second set of number values reads consecutively from the lower left corner, left to right, with increase by fifteen units per each horizontal row up to the next row.

5. A calculating device according to claim 4, in which said first set of numbers starts opposite the twelfth horizontal row of said second set.

6. A calculating device according to claim 1, in which the coordinating element has a cut-out corner for sighting on the first set of number values and a perforation spaced from said corner for sighting on the other set of number values.

7. A calculating device according to claim 1, in which the coordinating element has a set of figures inverted with respect to the figures on the panel, and reading consecutively from right to left in the successive rows to the top of said element.

HENRY S. PACKARD.

References Cited in the file of this patent

UNITED STATES PATENTS

| Number | Name | Date |
|---|---|---|
| 860,662 | Herbert | July 23, 1907 |
| 1,162,828 | Constantijn | Dec. 7, 1915 |
| 1,732,983 | Orchard | Oct. 22, 1929 |
| 1,819,921 | Rice | Aug. 18, 1931 |
| 2,097,835 | Epps | Nov. 2, 1937 |

FOREIGN PATENTS

| Number | Country | Date |
|---|---|---|
| 107,527 | Sweden | June 1, 1943 |